July 13, 1926.
R. M. SUTPHEN ET AL
1,592,577
METHOD OF SURVEYING
Filed Jan. 18, 1923
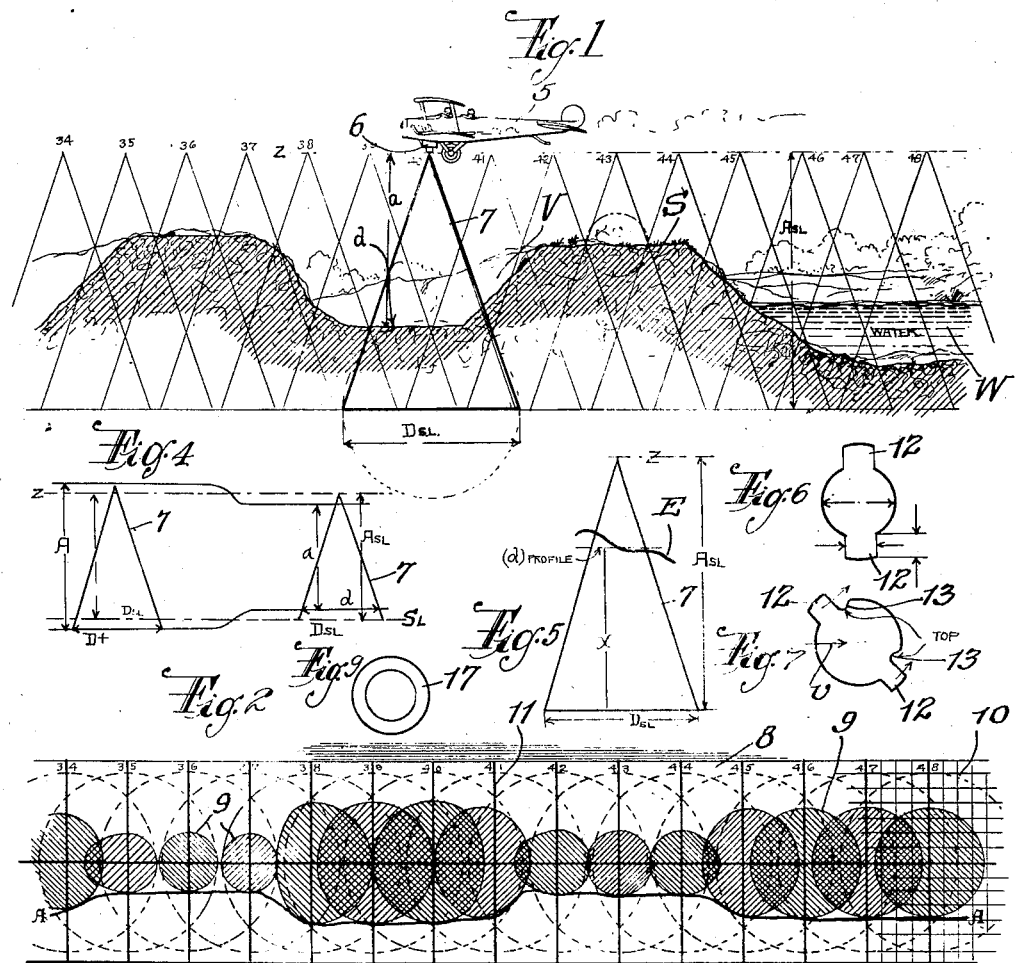
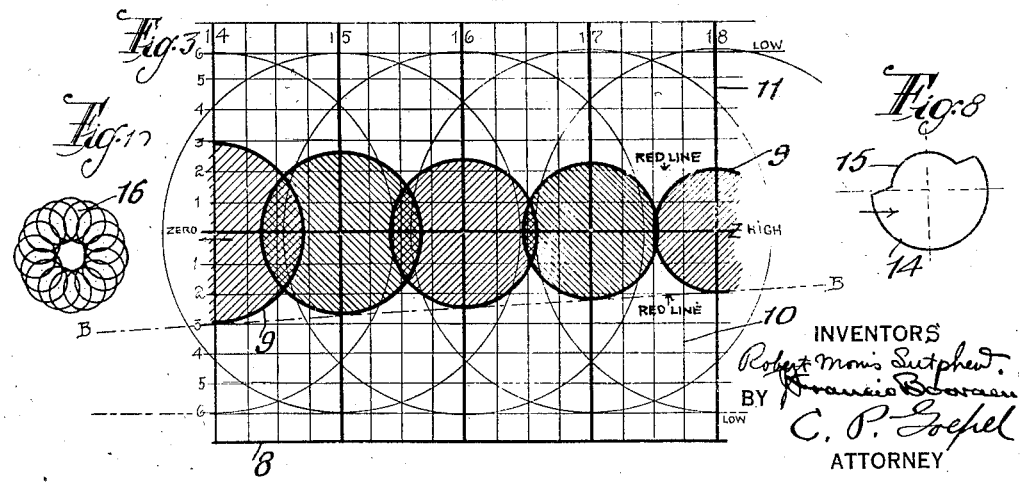
INVENTORS
Robert Morris Sutphen
Francis Boorman
BY
C. P. Goefel
ATTORNEY Patented July 13, 1926.

1,592,577

UNITED STATES PATENT OFFICE.

ROBERT M. SUTPHEN, OF NEWARK, NEW JERSEY, AND JOHN FRANCIS BOORAEM, OF GREENWICH, CONNECTICUT.

METHOD OF SURVEYING.

Application filed January 18, 1923. Serial No. 613,361.

This invention relates to an improved method of surveying and more particularly comprehends a simple and highly effective and accurate method of determining the profile configuration of the earth surface, and variations in altitude thereof.

The invention has for its purpose to provide a method as above characterized which will enable accurate land surveys to be made at night, the possibility of inaccuracies due to errors in mental calculation being wholly obviated. Moreover, our new method does not require the use of any special apparatus but may be readily practiced with apparatus now available. As will be seen from the following description, we aim by means of our present method to obtain a permanent photographic record from which a topographical profile may be easily plotted to accurately depict the character of a selected land area and its varying altitudes above sea level.

With the above and other objects in view, our invention consists in the improved method of making land surveys and in the several steps thereof as will be hereinafter more fully described, illustrated in the accompanying drawing and subsequently defined in the appended claims.

In the drawing wherein we have graphically illustrated our improved method and in which like reference characters designate corresponding parts throughout the several views:

Figure 1 is a vertical section through a part of the land area to be surveyed and in which we have diagrammatically indicated the manner in which our new method is practiced;

Figure 2 is a plan view of a fragment of sensitized photographic film showing the results obtained by our new method;

Figure 3 is a similar view on an enlarged scale diagrammatically illustrating the manner in which the different land elevations are photographically depicted upon the film;

Figures 4 and 5 are diagrammatic views illustrating certain of the theoretical truths involved in our new method;

Figures 6, 7 and 8 are diagrams illustrating different configurations of a projected outline which the latter assumes by encountering depressed or elevated areas or objects on the land surface; and Figures 9 and 10 illustrate another form in which the image may be projected upon the land surface.

It is well known that the illuminated field of a group of light rays projected from a lens—as from a search light—is conical in form, the rays diverging from the source in circles of ever-increasing diameter proportionate to the increase in distance from the light source.

When projected downward through the darkness of night from a height, the truncation of this light cone by a plane surface area of the earth or a body of water will be a true circle whose area will be directly proportionate to the distance of the light source above the interrupting surface. Furthermore, if the intersecting surface be irregular at the rim or edge of the light circle, the periphery of the intersection or truncation will be characteristic of and proportionate to the varying or variable distance of the corresponding portion of the truncating surface from the source of light. It is also quite evident even to the layman that such a projected light beam will change or vary in shape or contour in accordance with irregularities in or upon the particular section of the ground surface upon which the light beam is projected. We propose to utilize these well recognized truths for the purpose of accurately and automatically depicting in geometrical form the linear configuration or topographical profile of the land surface.

To this end, in one embodiment of the present invention, we employ a flying machine of suitable type, such as we have indicated in Figure 1 of the drawings by the numeral 5. On the underside of the fusilage of the flying machine there is suitably mounted and arranged within a housing or casing indicated at 6, a source of light which may be conveniently fed from storage batteries carried by the machine. The light rays are projected through a convex lens in the form of a conical beam of light, as indicated at 7. A cinematographic camera of a suitable construction is also enclosed within the housing or casing 6 and is so related to the light source that its lens is centered with its axis in parallel relation to the projected cone of light and so close thereto as to have substantially the same axis.

It will be understood from the above that this particular embodiment of our invention can be operatively employed only at night when the beam of light cast downwardly from the flying machine will outline upon the land surface a lighted area which presents a marked contrast to the land surface lying outside of such area.

In Figure 4 of the drawing "Z" is the theoretical path of travel of the flyer as traced by the light projecting lens at a previously determined elevation for the particular survey in question and is at a definitely known altitude, Asl. above sea level. The area of the sea level circle of the projected light cone for Asl is also definitely known. If now the course of the flyer rises or falls above or below the line Z, or the earth surface, under survey, varies in its elevation either above or below sea level represented by the broken line Sl, it is mathematically true that the areas of the circular truncation of the light cone or the areas of segments thereof or the circumference or diameter, will be directly proportionate to the distance from the source of light, or to the distance Asl minus X, from which X, the ever changing height of the varying profile is readily determined mathematically for any point of travel of the projecting lens. In this manner variations of the flyer from a true horizontal flight, thus carrying the source of the projected light and the camera above and below the true flight line Z, may be compensated for.

Since the surface of the land over which the flying machine is passing is at varying altitudes above sea level, it will be obvious that the area of the light beam projected on the ground surface above sea level will have a smaller diameter than the sea level diameter, such diameter of the light beam decreasing as the altitude of the land area over which the machine is flying, increases. This is indicated in the right hand side of Figure 4 of the drawing at $d$ where it will be noted that the solid horizontal line is above the broken line indicating sea level and therefore, the diameter of the light cone intersected by this line is less than the diameter of the base of the cone at sea level. It is also apparent that if in addition to an elevation of the land surface above sea level, the flying machine should fly at a lower altitude, then the area of the light beam cast on the ground surface would obviously be less than that indicated by the line $d$, since the source of light has approached closer to the land surface, as shown by the line $a$.

At the left hand side of the Figure 4, the opposite of the above condition is shown, the land surface being here indicated as below sea level and the flying machine flying at a higher altitude than that indicated by the line Z. Thus the distance between the surface of the ground and the source of light indicated by A is appreciably greater than the distance between sea level and the line Z or the distance indicated by the line $a$. Accordingly, the conical beam of light cast upon the ground surface will have an area in excess of the sea level area.

From the above considerations, it will be clearly seen that so long as the surface area is perfectly flat and unbroken, the light beam projected on the ground will have a truly circular outline, though the lighted area within this outline will vary as the elevation increases or decreases. However, in cases where the land surface is broken or irregular having hills and valleys, the circular form of the light beam projected on the ground surface is no longer maintained. Thus, as shown in Fig. 5 of the drawing, should the land surface in profile be inclined or irregular as indicated by the line E, then the light beam where it intersects the land surface will assume a distorted or irregular appearance in outline. The mean altitude above sea level is indicated by the line X but as this section of the land surface passes above and below said line and therefore, the source of light which remains at a constant altitude above sea level is at one time near the land surface and at the next instant more remote therefrom, the diameter and shape or form of the projected beam of light at the land surface is constantly varying. It will therefore, be apparent that in the passage of the flying machine at a constant altitude above such a land surface as we have shown in Figure 1, there will be frequent and marked changes in the area and outline shape of the light beam cast upon the land surface.

The cinematographic camera which is carried by the machine is automatically operated in synchronized relation with the speed of the machine so that there will be a certain definite number of exposures of the camera lens for every unit of linear travel by the flying machine. Thus, as shown in Figure 2 of the drawing, there will be depicted upon the sensitized film 8 of the camera, a sequentially related continuous series of photographic negatives 9 of the light beam cast upon the land surface during the travel of the flying machine. The film surface is sectioned, as shown at 10 by right angular lines which provide square blocks or fields each indicating a certain definite number of square feet of land surface for the predetermined theoretical altitude Z above sea level Asl of the flying machine. For any other position of the camera and source of light the area of these squares on the photographic film will vary in the same proportion as the light circle, or in other words, proportionately to the distance of the camera above sea level when the photographs are taken. Thus the squares upon the photographic film afford a true index of the area surveyed. Therefore, the actual area of land surface covered by each of the light beams as photographically depicted on the film can be readily determined. At equidistantly spaced intervals the surface of the film is marked off by the heavy transverse lines 11 to which we have applied numerals corresponding to the numerals shown at the top of Figure 1 of the drawing which indicate the spaced intervals of time and distance at which an exposure of the camera lens occurs.

From a comparison of Figures 1 and 2 of the drawings, it will be observed that while the flying machine is passing over the body of water shown at W in Figure 1, the light beam as photographically depicted on the film is in the form of a true circle, and owing to the frequency with which the photographic exposures are made, these circles are in overlapping relation to each other. Since the elevation of the water surface above sea level is constant, the photographs of the light images are all true circles of the same diameter, though smaller than sea level circle. As the flying machine progresses in its travel, and the source of light is positioned above the side of the elevated section of the land surface shown at S, the photographic reproduction of the light beam at the land surface taken at the point 45 will not appear on the film as a true circle, but will be diametrically contracted in one direction as clearly shown in Figure 2 of the drawing. The surface of the elevated section S of the land being surveyed being at an appreciably higher elevation than the surface of the water W, the area of the projected light beam on this section of the land surface will be considerably less than the area of the light beam when moving over the surface of the water. This likewise is clearly and accurately depicted on the photographic film as seen in Figure 2. When the flying machine moves to the left of the elevated land section S and passes over the depression or valley V, it will be apparent from the foregoing explanation that the area of the light beam on the land surface will increase.

As shown in Fig. 1, the source of light being located at the point 40, a part of the projected light beam strikes the land surface on the incline leading to the surface of the elevation S and therefore, the light image will not be a true circle, but as shown in Fig. 2, the right side thereof is somewhat flattened. The opposite condition exists when the light source on the flying machine is disposed above the point 38, the left hand side of the photographed image appearing flattened on the photographic film. Thus, as the machine progresses in its flight, the projected light beam on the land surface of frequently changing area and contour is repeatedly photographed so that one familiar with our present method can readily read the photographic film and thereby ascertain the linear topographical peculiarities of the land area over which the flying machine has passed. In Figure 2 of the drawing we have shown a line A—A drawn lengthwise of the film and touching the lower sides of the several photographic negatives of the light beam. This line indicates the variations in surface contour of the land in proper relative proportion to the actual variations in altitude of the different portions of the land surface over which the light beam was moved.

In Figure 3 of the drawing we have diagrammatically illustrated the principle involved in our new method. In this view the line Z indicates the line of flight of the machine carrying the source of light and the camera. The shaded circles indicate the light images which are projected upon the ground surface and these circles are shown as progressively increasing in diameter from the right to the left hand side of the line Z, thus showing that the machine was traveling over a section of the land surface gradually decreasing in elevation in the direction of flight of the machine. Since the circular form of the lighted area is maintained, it is apparent that the slope of the ground surface is regular and in the form of a succession of flat or plane surfaces. The horizontally extending lines in Figures 2 and 3 indicate different elevations of the land surface from sea level to an elevation which would coincide with the elevation of the source of light, the light circles shown in Figure 3 designating the diameter of the projected light beams at sea level, while the line B—B touching the lower sides of the photographed light images indicates the variations in sea level altitude of the land surface.

In Figures 6 and 7 of the drawings we have illustrated the outline form of the light beam as it will be photographically depicted upon the sensitized film when the moving light projector is passing over a trench. In Fig. 6 the projections 12 at opposite sides of the outline indicate the presence of a trench in the land surface, the extent of such projections denoting the depth of the trench. The altitude of the machine above sea level being definitely known, by comparison of the maximum diameter of the photographed light beam with the sea level diameter of such light beam, the actual elevation of the land surface and the depth and width of the trench may be readily determined. In Figure 6 the machine is flying parallel with the trench while in Figure 7, the machine is moving at an angle with respect to the line of the trench as indicated by the arrow v. The indentations 13 at one side of the trench indicate earth work or an embankment for the protection of the occupants of the trench. Thus it can at once be noted upon an examination of the film in what direction the occupants of the trench are directing their fire.

In Figure 8 we have illustrated the form which the light beam will assume when passing over a wall, the outline of larger diameter being shown at 14, indicating the ground surface at a lower elevation, while the portion of smaller diameter shown at 15 indicates the top surface of the wall. By comparing these diameters with the diameter of the light beam at sea level projected from the machine flying at a known altitude, the height of the wall can be readily determined.

Instead of projecting the light beam in the form of a solid disc or circular field of light, we may arrange a multiplicity of lenses in annular form as shown at 16 in Figure 10 so as to project an annular or ring shaped beam of light 17, as in Figure 9, upon the ground surface. This annular light beam will likewise vary in diameter as the altitude of the source of light above sea level is increased or decreased and the outline form or shape of said light band will change or vary in accordance with the character of the land surface over which it is moved. In this case, the cinematographic camera can be conveniently arranged within the annular series of light projecting lenses.

From the foregoing description considered in connection with the accompanying drawing it will be seen that by means of our improved method, accurate land surveys may be conveniently made at night with definitely accurate results and in which the possibility of human error is reduced to a minimum. It will accordingly be understood that we do not consider ourselves necessarily limited to the precise means to which we have referred for practicing our new method, but reserve the right to employ other equivalent means which may be successfully used with comparably satisfactory results, and as may be fairly embraced within the spirit and scope of the appended claims.

We claim:

1. In a method of surveying at night, moving a downwardly projecting conical light beam over a land surface, whereby the outline of said beam at the land surface assumes characteristic changes in form and area as determined by varying formations and elevations of the land surface above sea level, and sequentially photographically depicting such changes in form and area of the outline to provide a permanent record thereof.

2. In a method of surveying, projecting a conical beam of light upon a land surface from a flying machine moving in one direction at a predetermined altitude, such light beam having a known intercepted diameter at sea level, photographing the light beam projected on the land surface at regular intervals to thereby obtain a permanent record of the changes in outline shape and area of the light beam during its movement over the land surface, and finally comparing the photographed images in sequential order and with relation to the known sea level diameter of the light beam to thereby determine the linear configuration of the land surface.

In testimony that we claim the foregoing as our invention, we have signed our names hereunder.

ROBERT M. SUTPHEN.
J. FRANCIS BOORAEM.